(12) United States Patent
Kaneko (10) Patent No.: US 6,773,540 B2
(45) Date of Patent: Aug. 10, 2004

(54) PARTICLE BOARD AND METHOD OF MAKING THE SAME

(75) Inventor: Shinichi Kaneko, Nagoya (JP)

(73) Assignee: Nichiha Co., Ltd., Nagoya (JP)

( * ) Notice: Subject to any disclaimer, the term of this patent is extended or adjusted under 35 U.S.C. 154(b) by 132 days.

(21) Appl. No.: 10/075,199

(22) Filed: Feb. 15, 2002

(65) Prior Publication Data

US 2002/0100533 A1 Aug. 1, 2002

Related U.S. Application Data

(62) Division of application No. 09/512,825, filed on Feb. 25, 2000.

(30) Foreign Application Priority Data

Oct. 1, 1999 (JP) ............................................ 11-281190

(51) Int. Cl.$^7$ ........................... B32B 21/02; B32B 31/20
(52) U.S. Cl. ..................... 156/283; 156/296; 156/309.6; 264/112; 264/113; 264/122
(58) Field of Search ................................ 156/62.2, 296, 156/283, 309.6; 264/112, 113, 122

(56) References Cited

U.S. PATENT DOCUMENTS 3,891,738 A * 6/1975 Shen .......................... 264/101
5,981,631 A * 11/1999 Ronden et al. ................ 524/13

FOREIGN PATENT DOCUMENTS

| EP | 0 062 389 | 10/1982 |
|----|-----------|---------|
| FR | 1 318 585 | 5/1963  |
| GB | 1 014 961 | 12/1965 |
| JP | 5-177769  | 7/1993  |

* cited by examiner

*Primary Examiner*—Sam Chuan Yao
(74) *Attorney, Agent, or Firm*—Oblon, Spivak, McClelland, Maier & Neustadt, P.C.

(57) ABSTRACT

A particle board having wooden materials coated with an adhesive of a thermosetting resin and pressurized with being heated includes a core layer and face layers provided on both, front and back, sides of the core layer. The wooden materials of the face layer are smaller in the average particle diameter than the wooden material of the core layer and voids between the adjacent wooden materials in the face layer and the core layer are filled with resin particles of a thermoplastic resin by being pressurized with being heated.

4 Claims, 7 Drawing Sheets

PARTICLE BOARD AND METHOD OF MAKING THE SAME

BACKGROUND OF THE INVENTION

1. Field of the Invention

The present invention relates to a particle board for use as a structural material or a furniture component and a method of making the same.

2. Description of the Related Arts

Particle boards are panel-like products made by bonding wooden materials with an adhesive. Most of such particle boards have a three-layer construction consisting mainly of a core layer and two face layers formed on both, front and back, sides of the core layer. The core layer comprises relatively large sized wooden materials hence creating visually recognizable voids. To the contrary, the face layers comprise relatively small sized wooden materials hence being close structure.

Such particle boards are made by supplying wooden materials with a spray of an urethane adhesive, forming, and pressurizing them with heating. The urethane adhesive is hardened when its isocyanate reacts on a hydroxy functional group in the wooden materials. The amount of the adhesive may be approximately from 5 to 10 percent and at the maximum approximately 15 percent on the basis of the whole weight of the wooden materials.

However, while the particle board is functioning sufficiently as a bearing board member, which is unfavorable in the resistance to water because its components are mainly wooden materials. This is, the wooden materials have a hydrophilic property because of its hydroxy functional group.

As the particle board is poor in the function of resistance to water, its water-content gradient may cause deflections and dimensional changes of its structure or its water remaining may result in the development of mold and the decomposition of wooden constituents.

We, the applicants, invented a method for improving the resistance to water of a particle board without impairing its bearing property where a particle board is provided with two plastic sheets bonded to the front and back sides thereof, hence forming an integral structure. However, the prevention of water penetration through the butt ends into the particle board has not yet been achieved. It is hence necessary to improve the resistance to water while further contemplating the internal structure of the particle board.

SUMMARY OF THE INVENTION

It is an object of the present invention, in view of the foregoing drawback, to provide a particle board which is improved at its entirety in the resistance to water without impairing its performance as a bearing board member and to provide a method of making the same.

A particle board having wooden materials coated with an adhesive of a thermosetting resin and pressurized with being heated, the particle board comprising: a core layer and face layers provided on both, front and back, sides of the core layer, wherein the wooden materials of the face layer are smaller in the average particle diameter than the wooden material of the core layer; and voids between the adjacent wooden materials in the face layer and the core layer are filled with resin particles of a thermoplastic resin by being pressurized with being heated.

In the particle board of the present invention, the voids between the wooden materials are filled with the resin particles of the thermoplastic and the wooden materials are then pressurized while being heated. This allows the particle board to be filled at not only the surfaces but also the interior with the thermoplastic resin having hydrophobic character. Accordingly, the resistance to water of the particle board will be improved throughout its whole structure.

While the voids between the wooden materials are filled with the resin particles, the wooden materials are securely bonded one another by the thermosetting resin. This provides a substantial resistance to load exerted on the front, back, left, and right sides. Accordingly, the particle board of the present invention will function sufficiently as a bearing board member.

Preferably, the average particle diameter of the resin particles in the face layers is smaller than that of the resin particles in the core layer.

This permits the resin particles and wooden materials in the face layers to be smaller than those in the core layer. Hence, the size of each resin particle is approximately close to the size of each wooden material in each of the face layers and the core layer. More particularly, the non-uniformity in the mixture due to a difference in the specific gravity between the wooden material (having a specific gravity of 0.4 to 0.6) and the resin particle (having a specific gravity of 0.9) is minimized. Accordingly, the thermoplastic resin particles providing a higher level of the resistance to water will be dispersed uniformly in the whole particle board, thus preventing the resistance to water from being varied locally in the particle board.

This present invention provides the particle board which is improved at its entirety in the residence to water without impairing its performance as a bearing board member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

In the present invention, as a matter of convenience, the average particle diameter of the wooden materials and the resin particles is represented by a median in a major distribution range of the particle sizes which is determined by screening.

The rate of the average particle diameter of the resin particles to the average particle diameter of the wooden materials in the face layers is preferably from 0.5 to 1.5. When the rate is smaller than 0.5, the mixture of the wooden materials and the resin particles in the face layers will hardly be uniform hence lowering the resistance to water of the particle board. When the rate exceeds 1.5, some of the resin particles may appear at the surfaces of the particle board to exhibit a pattern of clouds, thus causing the resistance to water to be varied from place to place in the particle board.

Similarly, the rate of the average particle diameter of the resin particles to the average particle diameter of the wooden materials in the core layer is preferably from 0.5 to 1.5. When the rate is smaller than 0.5, the mixture of the wooden materials and the resin particles in the core layer will hardly be uniform hence lowering the resistance to water of the particle board. When the rate exceeds 1.5, the resistance to water may be varied from place to place in the particle board.

Preferably, the amount of the resin particles is from 10 to 50 parts by weight based on 100 parts by weight of the wooden materials in the core layer and the face layers. As a result, the resistance to water of the whole particle board is improved significantly. Particularly, some of the thermoplastic resin are exposed at the butt ends of the particle board hence preventing the penetration of water from the butt ends sufficiently, and as a result, the resistance to water of the particle board is entirely improved significantly.

To the contrary, when the amount of the thermoplastic resin is smaller than 10 parts by weight, the resistance to water of the particle board will be lowered. When the amount exceeds 50 parts by weight, the particle board may be declined the necessary properties in handling, cutting, nailing, and so on.

As the thermoplastic resin, polyethylene, polypropylene, ethylene-propylene copolymer, ethylene-propylene terpolymer, polyvinyl chloride, polyvinylidene chloride, fluorine resin, polyester, and polyamide can be used.

Preferably, the resin particles of the thermoplastic resin is formed to be the identical or similar shape of that of the wooden materials. For example, the shape may be a column-, needle-, chip-, fiber-, or grain-like form.

Preferably, the front and back surfaces of the both face layers are close adherence to plastic sheets applied by pressurization with heating. The plastic sheets further improve the resistance to water at the front and back sides of the particle board and simultaneously improve the releasability of the particle board from heat-pressurize-apparatus. Also, when undertaking construction, in the nailing, the plastic sheets improve the stability of a board-fixation by nail.

The plastic sheets are, for example, a polyethylene sheet, a polypropylene sheet, an ethylene-propylene copolymer sheet, an ethylene-propylene terpolymer sheet, a polyvinyl chloride sheet, a polyvinylidene chloride sheet, a fluorine resin sheet, a polyester sheet, and a polyamide sheet. They are thermoplastic sheets to be made use of in the present invention.

As the wooden materials, wood chips, wood wafers, wood wool, wood strands, wood pulp, wood powder, and so on, are made use of in the present invention. The shape of the wooden materials may be a chip-, fiber-, or grain-like form.

The wooden materials are coated with the adhesive of the thermosetting resin. The adhesive is hardened when heated, thus bonding the wooden materials to each other. As the thermosetting resin, isocyanate, phenol, urea, and melamine-type can be used. The adhesive with which the wooden materials of the core layer are coated may be either identical to or different from the adhesive with which the wooden materials of the face layers are coated. For example, the wooden materials of the core layer may be coated with an isocyanate type adhesive while the wooden materials of the face layers may be coated with a phenol, urea, or melamine type adhesive. It is also possible to coat the wooden materials of the core layer and the face layers all are coated with an isocyanate resin type adhesive.

A method of making a particle boards, according to the present invention, is provided comprising a core layer and two face layers formed on both, front and back, sides of the core layer, comprising the steps of: preparing core layer wooden materials and face layer wooden materials which are smaller in the average particle diameter than the core layer wooden materials; applying an adhesive of a thermosetting resin to the core layer wooden materials and the face layer wooden materials; mixing resin particles of a thermoplastic resin with the core layer wooden materials and the face layer wooden materials to yield a core layer material mixture and a face layer material mixture; making a pile of the face layer material mixture and a pile of the core layer material mixture by turns, so as to form a semi-finished board product consisting of the core layer and the two face layers; and pressurizing the semi-finished board product with heating, so as to melt and cause the resin particles to permeate and fill the voids between the adjacent wooden materials.

In the method, a mixture of the wooden materials and the resin particles of the thermoplastic resin is formed to a desired size before pressurizing with heating. While the mixture is being heated and pressurized, the thermoplastic resin having a hydrophobic property is melted down to fill the voids between the wooden materials in the layers. Accordingly, the particle board will be improved in the resistance to water.

Since the voids between the wooden materials are filled with the melted thermoplastic resin particles in addition to the face layers having close structure throughout the front and back sides, the particle board will be increased in the resistance to any load exerted on the front, back, left, and right sides.

The face layer wooden materials are smaller in the average particle diameter than the core layer wooden materials. The face layer wooden materials and the core layer wooden materials may be prepared by chopping wood pieces into chips with a crusher and classifying the chips with a classifying apparatus.

Preferably, the resin particles to be mixed with the face layer wooden materials are smaller in the average particle diameter than those to be mixed with the core layer wooden materials. This allows the core layer resin particles to be similar in the size to the core layer wooden materials which are relatively large, therefore ensuring a substantially uniform level of the mixture. Equally, the face layer resin materials are similar in the size to the face layer wooden materials which are relatively small, therefore the mixture of them will substantially be uniform. Accordingly, the resistance to water of the particle board will practically be uniform throughout the structure.

The face layer resin particles are smaller in the average diameter than the core layer resin particles. The face layer resin particles and the core layer resin particles may be prepared by molding resin material, chopping into chips with a crusher and classifying the chips with a classifying apparatus.

Preferably, the face layer wooden materials are either identical or similar in the size and the shape to the face layer resin particles. This prevents the mixture from being not uniform due to a difference in the specific gravity between the two different components. Equally, the core layer wooden materials are either identical to or similar in the size and the shape to the core layer resin particles.

The similar sizes and shapes of the wooden materials and the resin particles may be prepared with the use of one single crusher or of two like crushers respectively.

The face layer may consist of one single layer or of two or more layers. When the face layer consists of two or more layers, it is desired that the average particle diameter of the wooden materials and the resin particles is gradually decreased from the interior of the particle board to the surfaces of that. This allows the both surfaces to be formed close construction and will hence contribute to the higher hardness of the surfaces of the particle board.

Preferably, the wooden materials are waste structural woods. This allows the waste structural woods to be favorably reused.

Preferably, the resin particles are recycled materials formed by melting by heat and forming waste thermoplastic resin pieces. This permits the waste plastic pieces to be favorably reused.

The coating of the wooden materials with the adhesive may preferably be applied while the wooden materials classified by sizes have been conveyed by pneumatic power. This allows drops of the adhesive to be applied uniformly to the surface of each wooden material.

In case that the adhesive has such a level of fluidity that it flows over the wooden materials, it is dried out when being conveyed by the pneumatic power. Before the adhesive arrives at the entrance of a mixer for mixing the wooden materials and the resin particles, it has been turned to a non-fluid phase. This prevents the adhesive from being transferred from the wooden materials to the resin particles during the mixing action. Accordingly, the adhesivity between the wooden materials during the process of pressurizing with heating will rarely be declined.

The temperature used for heating the particle board is preferably not lower than 150° C. for softening the resin particles of the thermoplastic resin and simultaneously hardening the thermosetting resin. If the temperature is lower than 150° C., the thermosetting resin may fail to be hardened.

The pressure to be applied to the particle board is preferably not lower than $2.0 \times 10^6$ Pa. If the pressure is lower than $2.0 \times 10^6$ Pa, the particle board may fail to be formed.

Embodiments

Embodiment 1

A particle board according to embodiment 1 of the present invention will be described referring to FIGS. 1 to 8.

Figure 1:
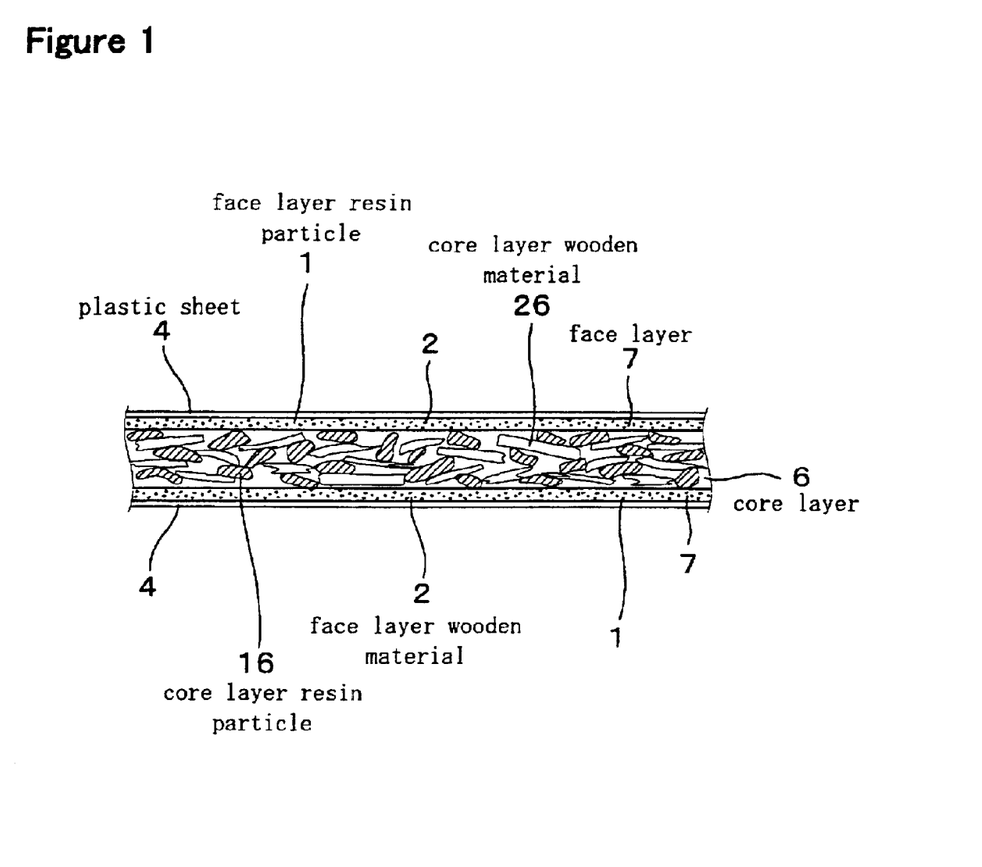
FIG. 1 is a cross sectional view of a particle board in Embodiment 1 of the present invention.

The particle board of this embodiment 1, as shown in FIG. 1, has a three-layer structure comprising a rough core layer 6 and two fine face layers 7 provided on the two, front and back, sides of the core layer 6, which is made by applying wooden materials of a needle-like (flake) shape with an adhesive, and forming.

Table 1 illustrates a distribution profile of the diameter of particles in face layer wooden materials 2 and core layer wooden materials 26. In this embodiment 1, the average particle diameter is determined from the distribution profile. As a matter of convenience, a median value of the major particle diameters in the profile shown in Table 1 is defined as the average particle diameter. More specifically, the average particle diameter of the face layer wooden materials 2 is 1.77 mm which is a median value in the profile of major particle diameters ranging from 1.18 mm to 2.35 mm. Similarly, the average particle diameter of the core layer wooden materials 26 is 2.03 mm which is a median value in the profile of major particle diameters ranging from 1.70 mm to 2.35 mm. The average particle diameter of the face layer wooden materials 2 is smaller than the average particle diameter of the core layer wooden materials 26.

The particle board is made by filling the voids between the wooden materials with resin particles of a thermoplastic resin (a polyethylene in this embodiment 1) and pressurizing them with heating. The average particle diameter of face layer resin particles 1 in the face layer 7 is 1.77 mm and the average particle diameter of core layer resin particles 16 in the core layer 6 is 2.03 mm. The average particle diameter of the face layer resin particles 1 is smaller than the average particle diameter of the core layer resin particles 16.

The wooden materials and the resin particles are similar in the size to each other in each of the face layer 7 and the core layer 6.

TABLE 1

| mesh size of filters S (mm) | face layer wooden material (weight %) | core layer wooden material (weight %) |
|---|---|---|
| 3.35 < S | 7.4 | 10.2 |
| 2.35 < S ≦ 3.35 | 13.7 | 21.8 |
| 1.70 < S ≦ 2.35 | 24.3 | 38.6 |
| 1.18 < S ≦ 1.70 | 24.3 | 15 |
| 0.60 < S ≦ 1.18 | 22.9 | 11.9 |
| S ≦ 0.60 | 7.4 | 2.6 |

The both, front and back, sides of the face layer 7 are coated with plastic sheets 4. The specific gravity of the plastic sheet 4 is approximately 0.1 to 0.3 in the finished board form.

The thickness of the core layer 6 is 10 mm and the thickness of the face layer 7 is 1 mm. The specific gravity of the particle board ranges approximately from 0.8 to 0.9. Thus, the particle board less the plastic sheets has a specific gravity of about 0.7 to about 0.8.

Figure 2:
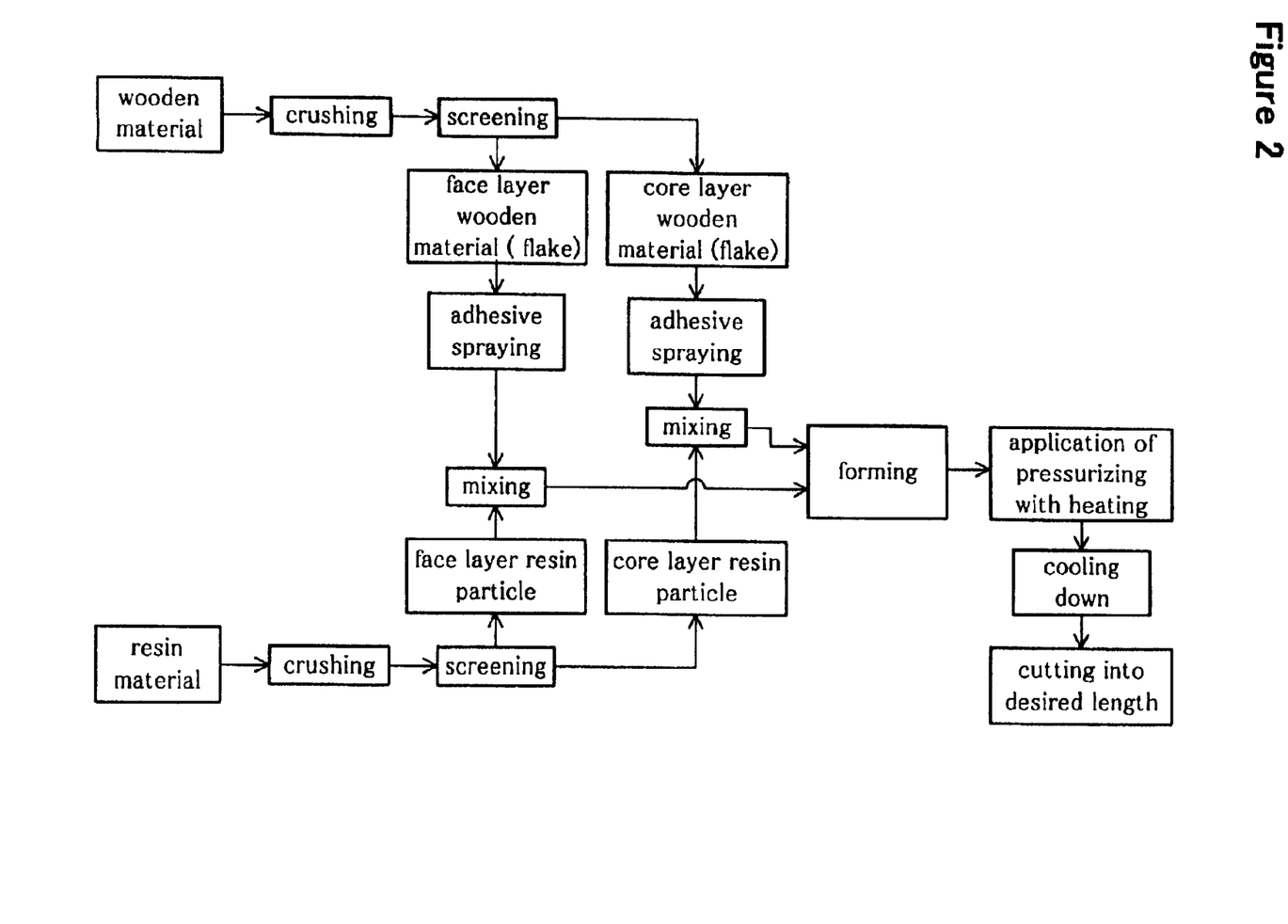
FIG. 2 is an explanatory view showing a procedure of making process of the particle board in Embodiment 1.

A method of making the particle board in this embodiment 1 is now explained referring to the process block-diagram shown in FIG. 2.

At first, wooden materials such as wood chips are chopped by a crusher into small pieces. The size of the wooden materials may vary depending on the performance of the crusher. In this embodiment, the crusher is a ring flaker which can produce needle-like particles of the wooden materials.

Then, the wooden materials are screened by several screens having different mesh sizes. As a result, it is found that distribution range of the wooden materials size is mainly from 0.60 to 2.35 mm.

Then, the wooden materials are divided into two groups: a large-size group for the core layer wooden materials and a small-size group for the face layer wooden materials as represented by the profile of particle diameters of Table 1.

Then, on both of the core layer wooden materials and the face layer wooden materials, the adhesive are sprayed. The adhesive employed preferably is a thermosetting resin such as an isocyanate adhesive (for example, Woodcure 300 by Nippon Polyurethane Industry Co., Ltd.). The amount of the adhesive is from 5 to 20 parts by weight based on 100 parts by weight of each the wooden material.

On the other side, the polyethylene plastic wastes comprising thermoplastic resin materials are chopped by a single-axis rotary shearing crusher into resin particles shaped column.

Then, those resin particles are screened and divided into two groups: a large-size group for the core layer resin particles and a small-size group for the face layer resin particles.

The core layer resin particle is substantially identical in the size to the core layer wooden material. Also the face layer resin particle is substantially identical in the size to the face layer wooden material.

Figure 3A:
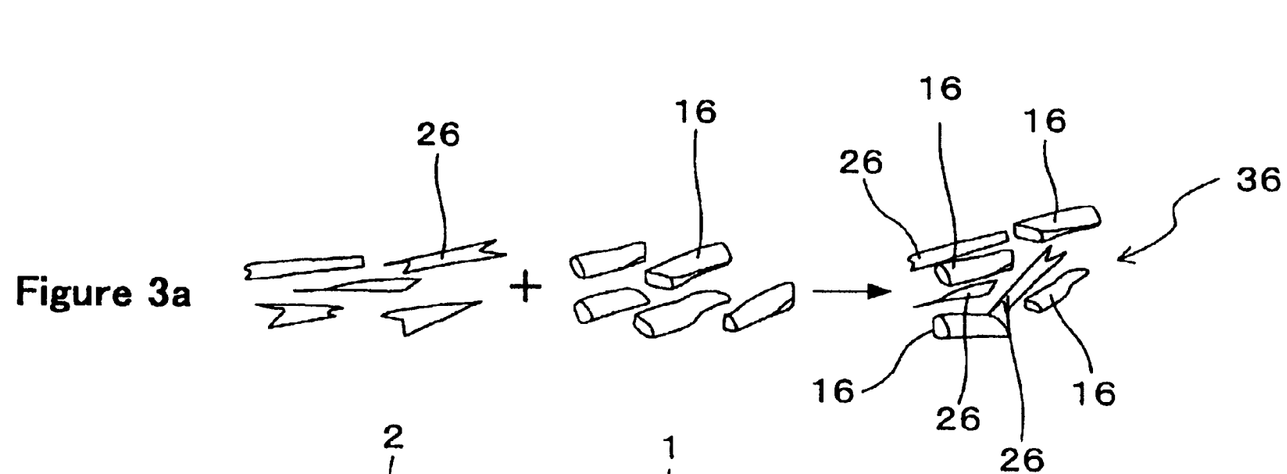
FIG. 3a is an explanatory view showing a core layer material mixture and FIG. 3b is an explanatory view showing a face layer material mixture in Embodiment 1.
Figure 3B:
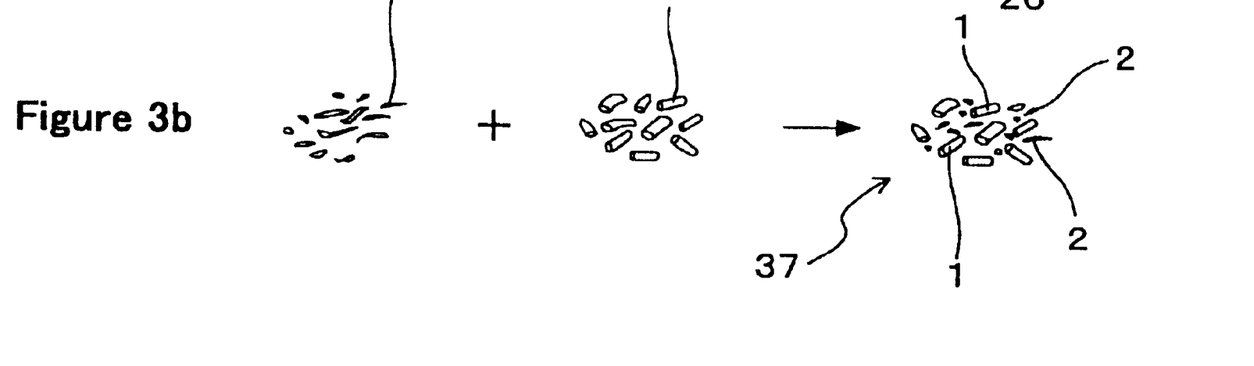

Then, 80% by weight of the core layer wooden materials 26 and 20% by weight of the core layer resin particles 16 are mixed together to yield a core layer material mixture 36, as shown in FIG. 3a. Also, 80% by weight of the face layer wooden materials 2 and 20% by weight of the face layer resin particles 1 are mixed together to yield a face layer material mixture 37, as shown in FIG. 3b.

Figure 4:
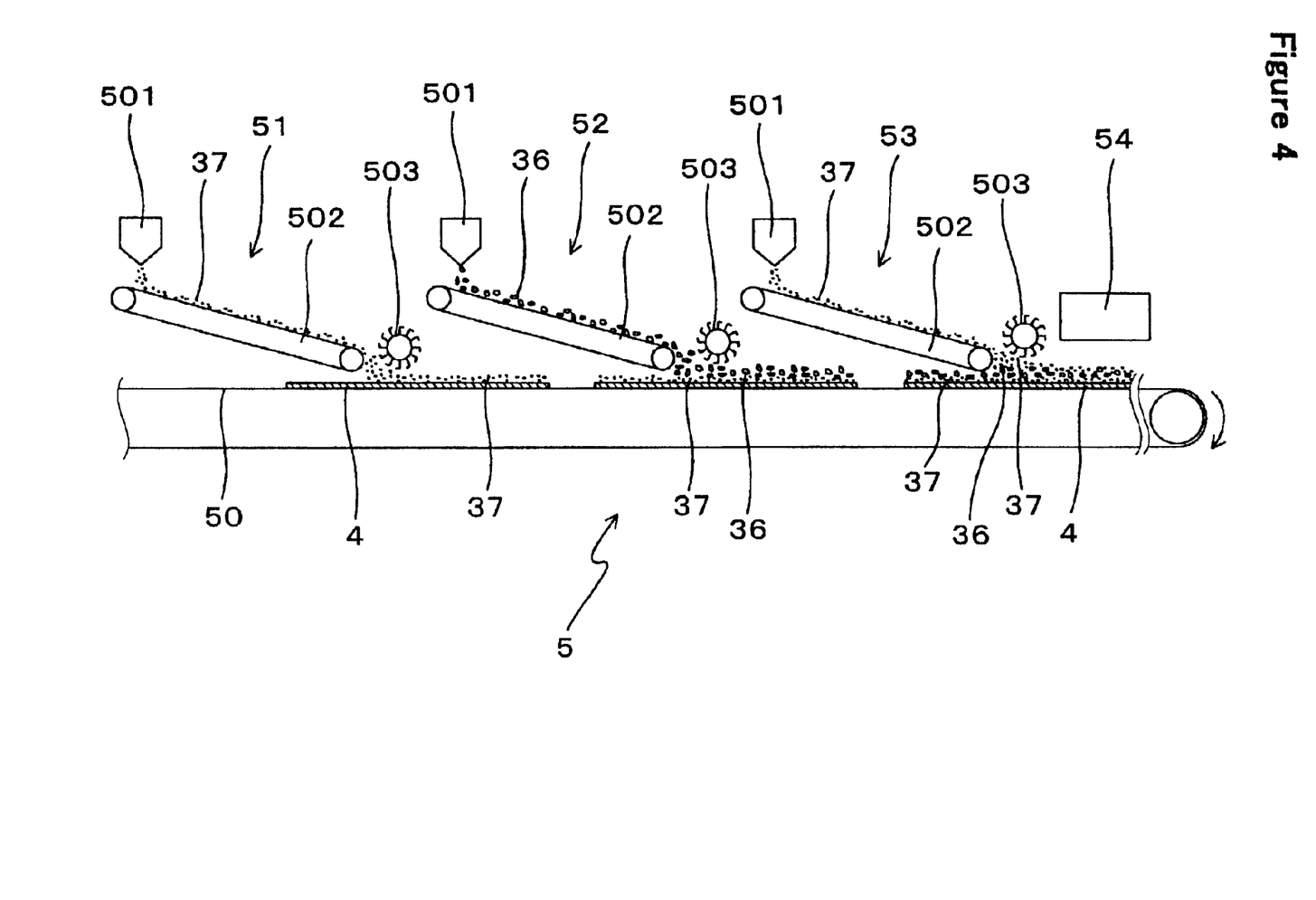
FIG. 4 is an explanatory view showing the forming apparatus in Embodiment 1.

Next, both the core layer material mixture and the face layer material mixture are provided for forming apparatus (as shown in FIG. 4) in order to product a semi-finished board product shaped mat. The forming apparatus is explained in more detail referring to FIG. 4. The forming apparatus denoted by 5 has a main conveyor 50 for transferring lots of plastic sheet-pieces.

Above this main conveyor 50, three material mixture applicators 51, 52 and 53 are installed.

The first applicator 51 comprises the material supply hopper 501, the feed conveyor 502 and the level brush roll 503. By this material supply hopper 501, the face layer material mixture 37 inside are supplied on the feed conveyor 502. And by the feed conveyor 502, the face layer material mixture 37 are carried and dispersed on the transfering plastic sheet 4 by its widthwise swing motion. And by the level brush roll 503, the face layer material mixture 37 on the transfering plastic sheet 4 are leveled its surface state.

Both the second applicator 52 and the third applicator 53 comprise the material supply hopper 501, the feed conveyor 502 and the level brush roll 503. And by the second applicator 52, the core layer material mixture 36 are heaped on the first face layer material mixture 37. Then by the third applicator 53, the second face layer material 37 are heaped on the second core layer material mixture 36.

And then by the plastic sheet-piece putting means, the plastic sheet-piece is put by turns on the second face layer material mixture 37.

Figure 5:
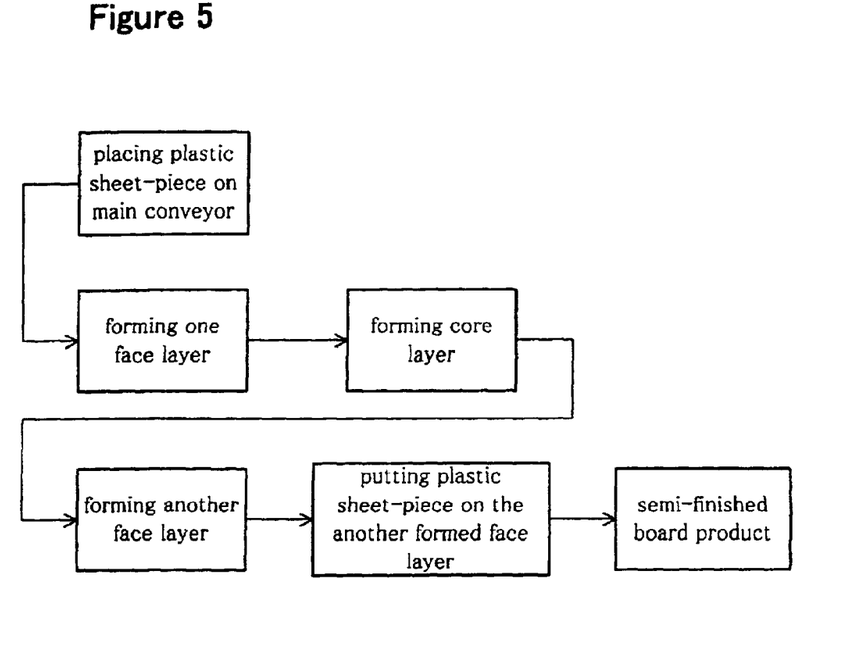
FIG. 5 is an explanatory view showing the forming process of the particle board in Embodiment 1.

FIG. 5 is a block-diagram illustrating a process of forming process identified in FIG. 2. The forming process is carried out by the forming apparatus 5 illustrated in FIG. 4. That is to say, at first, the plastic sheet 4 is placed on the main conveyor 50. Then, one face layer is formed on the plastic sheet 4. Then, a core layer is formed on the face layer. And then, the another face layer is formed on the core layer. At last, the another plastic sheet 4 is put on the another formed face layer.

Accordingly, a semi-finished board product 8 having a three-layer structure of the face layer, the core layer, and the face layer and shaped mat is obtained.

Figure 6A:
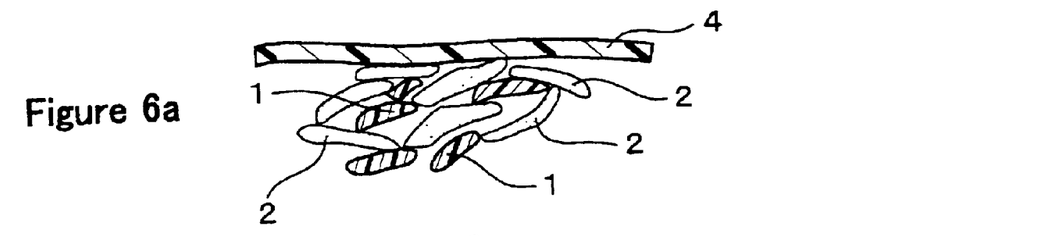
FIGS. 6a to 6c are explanatory views showing the behavior of plural materials (resin particles, a plastic sheet, and an adhesive), under pressurized condition with being heated in Embodiment 1.
Figure 6B:
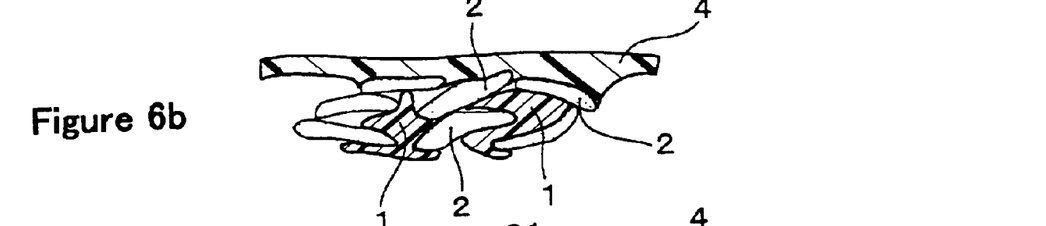
Figure 6C:
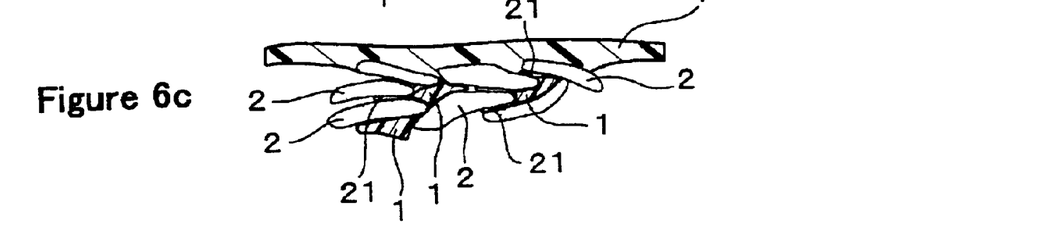

Then, the semi-finished board product 8 is pressurized with being heated on condition that the pressure is $4.0 \times 10^6$ Pa and the temperature is 170° C. for 5 to 20 minutes, for example. FIG. 6 shows the behavior of the face layer resin particles 1 and the face layer plastic sheet 4 (both being made of a polyethylene in this embodiment 1) under the condition. Before the pressure and the heat are applied, the face layer resin particles 1 and the face layer wooden materials 2 in a mixture remain in a particle form while being covered with the plastic sheet 4 as shown in FIG. 6a. As the pressure and the heat have been applied, the plastic sheet 4 is softened at 110° C. and melted at 120° C. as shown in FIG. 6b. The melted form of the plastic sheet 4 permeates and fills the voids between the face layer wooden materials 2. Simultaneously, the voids between the face layer wooden materials 2 in the particle board are filled with the softened face layer resin particles 1. When the temperature reaches at 170° C., the adhesive 21 coating over the face layer wooden materials 2 are hardened as shown in FIG. 6c. As a result, the face layer wooden materials are bonded to each other by tiny drops of the adhesive adhered on the surface of the materials.

Figure 7:
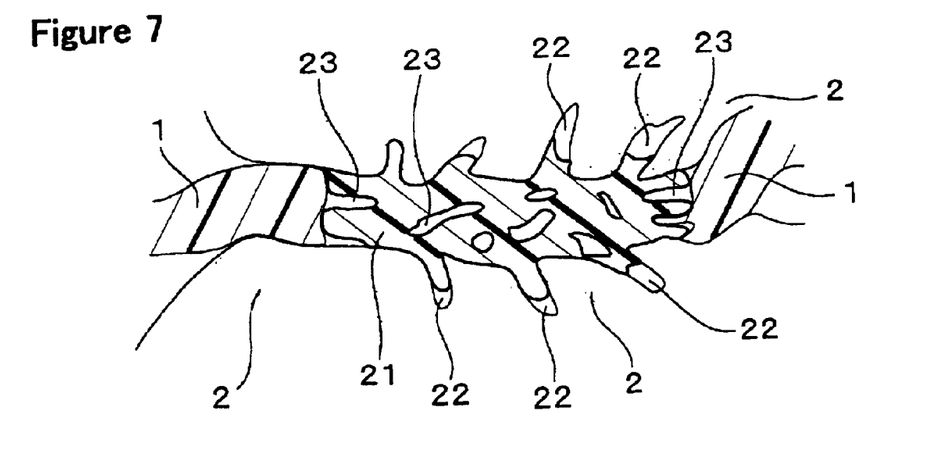
FIG. 7 is an explanatory view showing the state of the adhesive and the resin particles between wooden materials after the process of being pressurized with being heated in Embodiment 1.

As the pressure and the heat are being applied, the adhesive 21 moves into small recesses 22 in the surface of the face layer wooden materials 2, as shown in FIG. 7, hence generating the anchoring effect. Also, when the adhesive 21 is hardened, it develops voids 23 therein. The face layer resin particles 1 which are melted earlier then move into the voids 23 thus generating the anchoring effect.

Accordingly, the face layer wooden material 2 and the face layer resin particles 1 are tightly joined to each other while the face layer wooden materials 2 themselves are closely bonded together.

Similarly, the core layer wooden material and the core layer resin material are tightly joined to each other while the core layer wooden materials are closely bonded together in the same way of face layer wooden materials and face layer resin particles.

Moreover, the wooden materials themselves in the interface between the core layer and the face layer are closely bonded together while the wooden material and the resin particles are tightly joined to each other in the same way.

After application of the pressurizing with heating, the particle board is cooled down out of pressurizing and its resin particles and plastic sheets are solidified. Finally, the particle board is cut into a desired length.

In the particle board of this embodiment 1, not only its surfaces but also its interior are filled with the resin particles of a thermoplastic type. Accordingly, the resistance to water of the particle board will be increased.

Also, as best shown in FIG. 3, the wooden material and the resin particle in the face layer and the core layer are respectively similar in the size to each other and a difference between their specific gravities will be as small as negligible. Accordingly, the resistance to water of the particle board can be prevented from varying from one region to another. Moreover, the resistance to water at the butt ends as well as the surface of the particle boards will be improved, in addition to improvements of its releasability from the pressurize-apparatus and its handling property.

Figure 8:
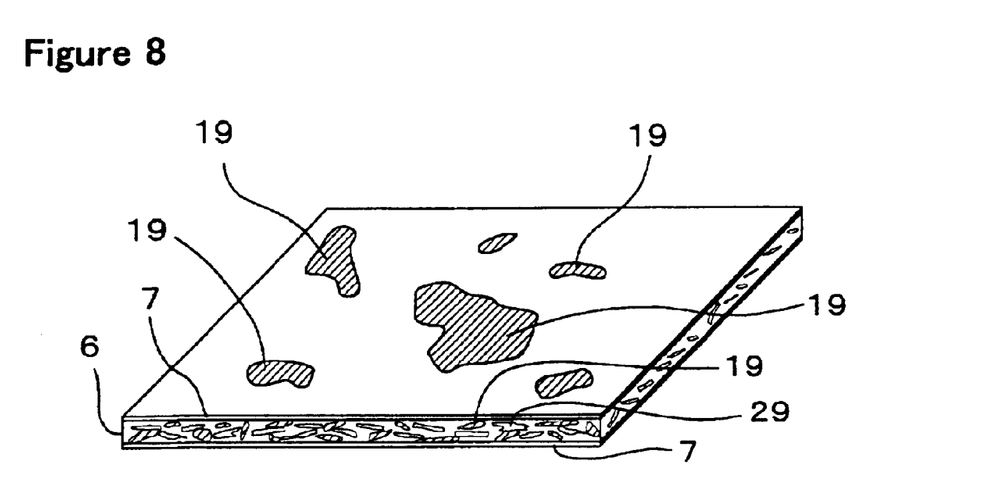
FIG. 8 is an explanatory view showing the unprepossessed products of a hardened thermoplastic resin in Embodiment 1.

In case that shown in FIG. 8, the wooden materials 29 and the resin particles 19 in the core layers 6 and the face layers 7 are formed to an unfavorable size or shape (i.e., for example, the resin particles chopped by the crusher are not screened but directly used for the face layers and the core layer), solidified thermoplastic resin portions of the resin particles 19 may appear on the surface of the particle board as their cloud-like configurations being clearly viewed, hence impairing the external appearance of the particle board.

Embodiment 2

Figure 9:
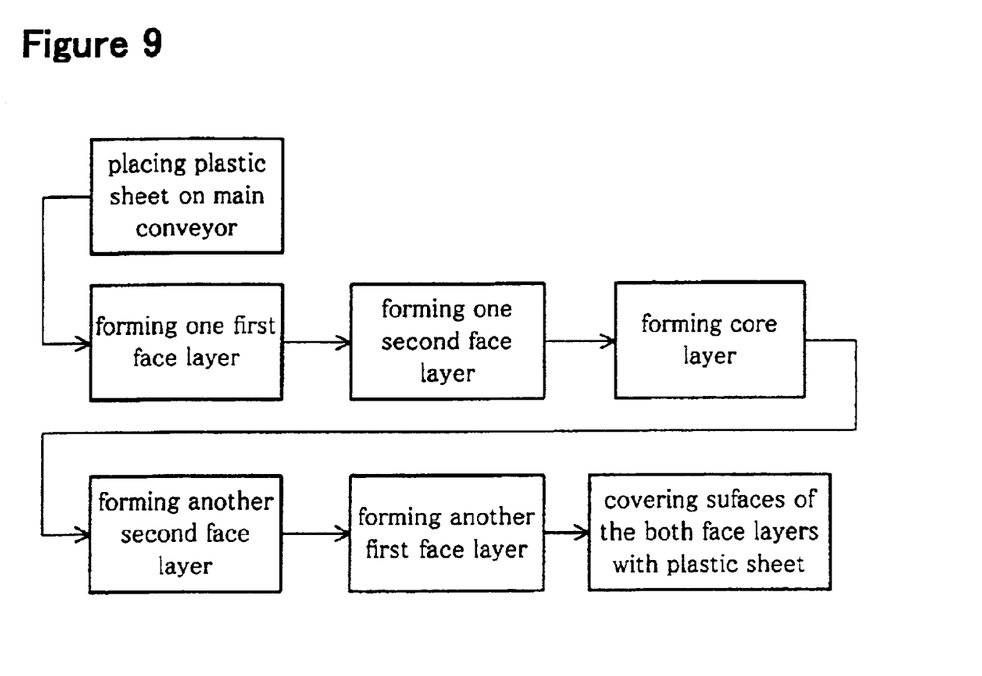
FIG. 9 is an explanatory view showing the forming process of the particle board in Embodiment 2.

This embodiment, as shown in FIG. 9, is provided the method of making two heaped face layers constitution. To be concrete, the face layer wooden materials and the face layer resin particles are heaped two times.

The wooden materials are chopped by a crusher to have an average diameter of 2.03 mm for use as the core layer wooden materials, an average diameter of 0.89 mm for use as the first face layer wooden materials, and an average diameter of 1.77 mm for use as the second face layer wooden materials.

The profile of the average particle diameters of the core layer wooden materials and the second face layer wooden materials is substantially similar to that shown in Table 1 of Embodiment 1. The major range of the particle diameter of the first face layer wooden materials is from 0.60 mm to 1.18 mm. A median value (0.89 mm) in the major range is the average diameter.

The resin particles are crushed by a single-axis rotary shearing crusher to have an average diameter of 2.03 mm for use as the core layer resin particles, an average diameter of 0.89 mm for use as the first face layer resin particles, and an average diameter of 1.77 mm for use as the second face layer resin particles.

The wooden materials are then coated with an adhesive of a thermosetting resin.

This is followed by mixing the core layer wooden materials with the core layer resin particles, the first face layer wooden materials with the first face layer resin particles, and the second face layer wooden materials with the second face layer resin particles to yield a core layer material mixture, a first face layer material mixture, and a second face layer material mixture respectively.

The material mixtures are then combined together by a forming apparatus to have a semi-finished board product. The forming apparatus used in this embodiment 2 includes five material mixture applicators.

More specifically as shown in FIG. 9, plastic sheets is place on the main conveyor, then the first face layer material mixture is heaped on that plastic sheet, then the second face layer material mixture is heaped on the surface of that first face layer material mixture, then the core layer material mixture is heaped on the surface of the second face layer material mixture, then another second face layer material mixture is heaped on the core layer material mixture, and then another first face layer material mixture is heaped on the surface of the second face layer material mixture. As a result, a combination of the first face layer, the second face layer, the core layer, the second face layer, and the first face layer is produced and then covered at the top of the first face layer with a plastic sheet to complete the semi-finished board product.

Then, the semi-finished board product is pressurized with being heated by the same manner as of Embodiment 1 and cut to a desired size to have a finished particle board.

In this embodiment 2, the average diameters of the wooden materials and the resin particles are arranged to be much smaller in the first face layer than in the other layers. The average diameter in the first face layer is slightly smaller than that in the second face layer. This allows the average particle diameter to decrease gradually from the core layer to the surface layer of the particle board. Accordingly, the surface structure of the particle board of this embodiment 2 having a couple of the face layers at each side is more closer than that of the previous embodiment 1 which has a single face layer at each side.

What is claimed is:

1. A method of making a particle board comprising a core layer and two face layers formed on both, front and back, sides of the core layer, comprising preparing core layer wooden materials and face layer wooden materials which are smaller in the average particle diameter than the core layer wooden materials;

applying an adhesive of a thermosetting resin to the core layer wooden materials and the face layer wooden materials;

mixing resin particles of a thermoplastic resin with the core layer wooden materials and the face layer wooden materials to yield a core layer material mixture and a face layer material mixture;

forming a semi-finished board product, the forming comprising, providing a first plastic sheet;

forming a first face layer on the first plastic sheet by dispersing the face layer material mixture on the first plastic sheet and leveling the dispersed face layer material mixture;

forming a core layer on the first face layer by dispersing the core layer material mixture on the first face layer and leveling the dispersed core layer material mixture;

forming a second face layer on the core layer by dispersing the face layer material mixture on the core layer and leveling the dispersed face layer material mixture; and putting a second plastic sheet on the second face layer; and pressurizing the semi-finished board product with heating, so as to melt and cause the first and second plastic sheets and the resin particles to permeate and fill the voids between the adjacent wooden materials, wherein said providing a first plastic sheet, said forming a first face layer on the first plastic sheet, forming a core layer on the first face layer, forming a second face layer on the core layer, and putting a second plastic sheet on the second face layer are performed sequentially.

2. A method of making particle board according to claim 1, wherein the resin particles to be mixed with the face layer wooden materials are smaller in the average particle diameter than those to be mixed with the core layer wooden materials.

3. A method of making a particle board according to claim 1, wherein the wooden materials are waste structural woods.

4. A method of making a particle board according to claim 1, wherein the resin particles are recycled materials formed by melting by heat and shaping waste thermoplastic resin pieces.

* * * * *